May 23, 1939.   A. S. T. LAGAARD   2,159,726
DOUGH CUTTER
Filed Feb. 15, 1937   2 Sheets-Sheet 1

Inventor
Alexander S. T. Lagaard

By Caswell + Lagaard
Attorneys

May 23, 1939.  A. S. T. LAGAARD  2,159,726
DOUGH CUTTER
Filed Feb. 15, 1937  2 Sheets-Sheet 2

Inventor
Alexander S. T. Lagaard

Patented May 23, 1939

2,159,726

UNITED STATES PATENT OFFICE 2,159,726

DOUGH CUTTER

Alexander S. T. Lagaard, Minneapolis, Minn.

Application February 15, 1937, Serial No. 125,691

5 Claims. (Cl. 107—14)

My invention relates to dough cutters and particularly to cutters used for cutting annular formations of dough such as doughnuts and the like.

An object of the invention resides in providing a dough cutter which will be simple in construction and positive in operation.

Another object of the invention resides in providing a dough cutter in which accurately measured quantities of dough can be repeatedly severed from the mass of dough.

An object of the invention resides in providing a dough cutter in which churning of the dough passing through the same is minimized.

A still further object of the invention resides in providing a dough cutter having a hopper formed with a downwardly directed outlet, a receiver disposed below said hopper and communicating therewith through said outlet and a die communicating with said receiver together with a cylinder and piston therein disposed intermediate the die and hopper for drawing dough into the receiver and discharging the same through the die.

An object of the invention resides in providing a dough cutter in which the dough travels through a minimum distance from the dough hopper to the die.

Another object of the invention resides in constructing said receiver tubular and in arranging said receiver in a vertical direction and in further arranging said cylinder in a horizontal direction extending laterally from the receiver intermediate the ends thereof.

A feature of the invention resides in utilizing a slide for controlling the passage of dough into the receiver.

An object of the invention resides in attaching the receiver to the bottom of the hopper and in arranging the slide between the joining parts of the receiver and hopper.

Another object of the invention resides in providing a V-shaped deflector within said receiver for directing the dough toward and from the cylinder.

Other objects of the invention reside in the novel combination and arrangement of parts and in the details of construction hereinafter illustrated and/or described.

Figure 1:
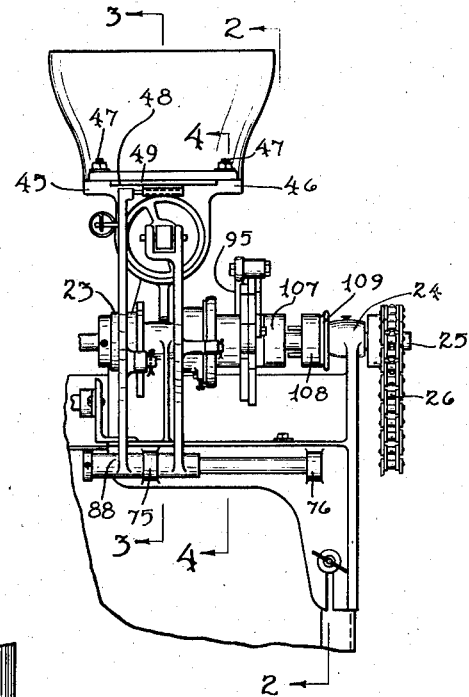
Fig. 1 is an elevational view of a portion of a doughnut machine illustrating an embodiment of my invention applied thereto.
Figure 2:
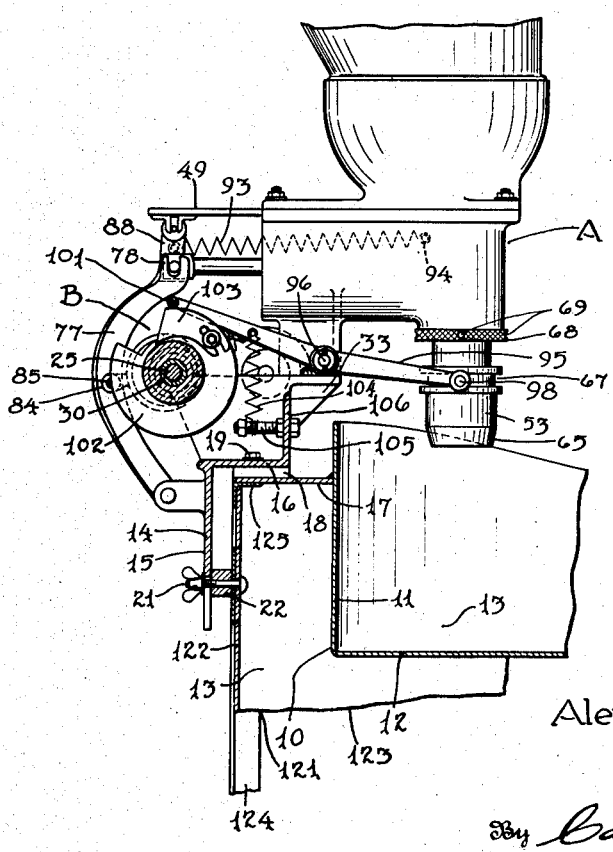
Fig. 2 is an elevational sectional view taken on line 2—2 of Fig. 1.

My invention resides in a cutter which may be applied to any type of doughnut machine. This cutter is particularly applicable to a machine such as shown in the copending application of Peter J. Toews, Serial Number 114,395, filed December 5, 1936 for Doughnut machines. Since this invention directly associates with a portion only of the structure shown in said application, so much thereof as will be needed to describe the present invention will be shown, reference being had to the said application for patent for further details of the remainder of the doughnut machine.

The doughnut machine with which the invention is illustrated comprises a case 121 which is constructed with a rear wall 122, side walls 123 and a front wall not shown. These walls are attached to angle iron legs, one of which is indicated at 124 and the upper ends of these walls have secured to them, angle iron frame members, the member attached to wall 122 being indicated by the reference numeral 125. Supported in the case 121 is a pan 10 which is constructed with vertical walls 11 and a bottom 12 to form a way 13 along which the cooking liquid travels. The way 13 is provided with a number of reaches which have not been shown in this application and the doughnut cutter forming a feature of the invention is attached to the machine in such a manner as to discharge the cooking liquid in one of the reaches of the way 13. The uppermost portion of the pan 10 has attached to it a table 17 which is supported on the frame members 125 and secured thereto. The cooking liquid is progressed through the way 13 of pan 10 by means of an impeller, not shown, which causes circulation of the cooking liquid through the machine and which causes the doughnuts deposited by the cutter to be progressed through the machine at the proper rate of speed. At a suitable position in the way 13 the doughnuts are turned over and at the end of the way the finished doughnuts are removed from the machine, all as disclosed in said application for patent of Peter J. Toews.

The case 121 has attached to it a bracket 14 which is constructed with a flange 15 extending along the rear wall 122 of said case and with a base 16 overlying the table 17 and frame member 125. The base 16 of bracket 14 rests upon a bar 18 overlying table 17 and frame member 125 and is secured to said bar and frame member by means of bolts 19. The flange 15 of bracket 14 is secured to the leg 124 of case 121 by means of a bolt 21 and a spacer 22. This bracket supports the cutter proper which is indicated in its entirety by the reference numeral A and the operating mechanism B by means of which said cutter is operated.

Formed on the base 16 are two bearings 23 and 24 in which is journaled a shaft 25. This shaft is driven by a chain 26 from the transmission of the device situated below the pan 10 and which has not been illustrated in the drawings. It can readily be comprehended that any drive means for the chain 26 may be provided. Rotatably mounted on the shaft 25 is a sleeve 30 which carries all the operating parts of the operating mechanism B which effect movement of the parts of the cutter and which will be presently more fully described. Sleeve 30 is constructed with a jaw clutch member 107 which is adapted to be engaged by another jaw clutch member 108 splined to the shaft 25. Any desired construction may be used for operating the jaw clutch member 108, a groove 109 being provided for the purpose. Such construction forming no feature of the invention has not been shown in this application.

Figure 3:
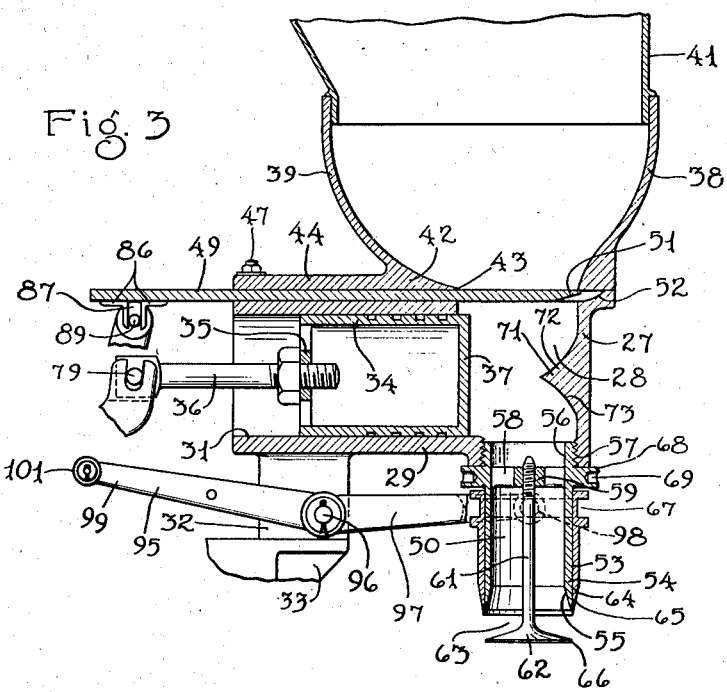
Fig. 3 is a fragmentary elevational sectional view taken on line 3—3 of Fig. 1 and drawn to a larger scale.

The cutter A as best shown in Fig. 3 comprises a receiver 27 which is tubular in form and which is arranged in a vertical position. This receiver is provided wtih a chamber 28 within the same. Issuing laterally from the receiver 27 is a cylinder 29 which is constructed with a bore 31. This bore communicates with the chamber 28. The receiver 27 is supported by means of a leg 32 cast integral with the cylinder 29 and which is attached to a support 33 cast on the base 16 of bracket 14. Within the cylinder 29 is slidably mounted a piston 34 which is constructed with a piston head 35 to which is rigidly secured a piston rod 36. The other end 37 of the piston is cut off square though the same may be constructed otherwise, if desired.

Superimposing the receiver 27 is a hopper 38 which is constructed with a throat 39 to which the hopper proper indicated at 41 is attached. This latter structure is constructed of sheet metal and may be shaped in any form to receive and hold the dough. The throat 39 is constructed as a casting and is formed with a bottom 42 which has an opening 43 in the same extending downwardly and serving as a discharge outlet for the hopper. The bottom 42 is constructed with a plate-like extension 44. This extension rests upon two flanges 45 and 46 formed on the receiver 27 and extending along the uppermost portion of the cylinder 29. These parts are bolted together by means of bolts 47.

Formed in the uppermost portion of the receiver 27 and in the portion of the cylinder 29 between the flanges 45 and 46 is a groove 48. In this groove is slidably mounted a slide 49 which is adapted to extend across the outlet 43 and which serves as a valve for controlling the passage of dough through said outlet and into the chamber 28 of receiver 27. The end 51 of said slide is cut on a bevel as shown in Fig. 3 and is adapted to enter a notch 52 in the receiver 27 so as to completely cut off the dough passing through the outlet 43.

Attached to the lowermost portion of the receiver 27 is a die 53. This die consists of a tube 54 sharpened at its lower end as indicated at 55. Within the tube 54 is formed a passageway 50 which communicates with chamber 28. The upper end of the die is constructed with a threaded nipple 56 which is adapted to screw into a threaded boss 57 on the lowermost portion of the receiver 27. The tube 54 is constructed near its upper end with a bridge 58 which is provided at the center with a boss 59. This bridge is so constructed that dough may readily pass the same. The boss 59 is threaded to receive a sipndle 61 which carries at its lower end an outwardly flaring head 62. The end 55 of tube 54 and the head 62 form an annular orifice 63 through which annularly formed portions of dough are extruded. Slidable upon the exterior of the tube 54 is a sleeve 64. The extreme end of this sleeve is beveled as indicated at 65 to form a shearing device which cooperates with the peripheral edge 66 of head 62 to shear off the dough extruded through the orifice 63. Sleeve 64 is constructed with a groove 67 at its upper end by means of which the sleeve is reciprocated. Tube 54 is constructed at its uppermost end with a collar 68 which engages the lowermost portion of the boss 57. In this collar is formed a number of drilled holes 69 which may be engaged by a suitable spanner wrench for the purpose of attaching the die to the receiver. In order to form doughnuts of different dimensions different sizes of dies may be used and the same readily interchanged.

Within the chamber 28 and directly opposite the piston 34 is a V-shaped deflector 71. This deflector is disposed in such a manner that when the cylinder is moved to the extreme left, as shown in Fig. 3, the upper surface 72 of said deflector serves to direct the dough passing through outlet 43 into the bore 31 of cylinder 29. When the piston 34 is traveling in the opposite direction the under surface 73 of said deflector serves to guide the dough extruded from the bore 31 of cylinder 29 into the die 53.

Figure 4:
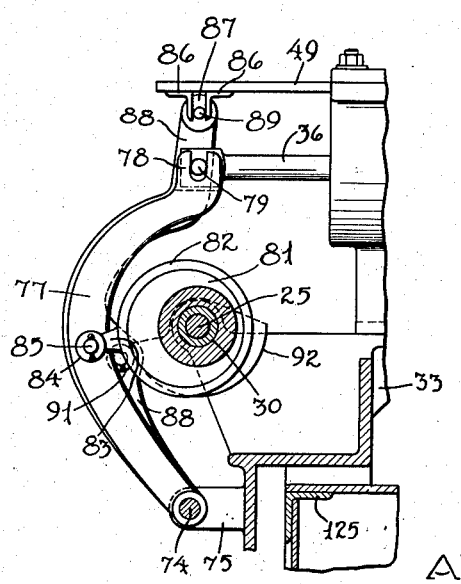
Fig. 4 is a fragmentary elevational sectional view taken on line 4—4 of Fig. 1.

The piston 34 is reciprocated by a construction best shown in Fig. 4. Positioned below the shaft 25 is another shaft 74. This shaft is attached to two bearings 75 and 76 formed on the flange 15 of bracket 14. Mounted for oscillation on this shaft is a bent arm 77 which extends about the shaft 25 and terminates in its upper end in a fork 78. This fork straddles a pin 79 attached to the end of the piston rod 36. Mounted on the sleeve 30 is an eccentric 81 which is provided with an eccentric strap 82 encircling the same. This eccentric strap is secured to a short connecting rod 83 which is provided with a boss 84. A pin 85 extends through the boss 84 and the arm 77 and forms a pivotal connection between the eccentric strap 82 and said arm. As shaft 25 rotates, arm 77 is moved in an oscillatory manner to reciprocate the connecting rod 36 and piston 34.

The slide 49 has secured to the underside thereof two spaced angle lugs 86 which form a groove 87 therebetween. Pivoted to the end of the shaft 74 is another arm 88 which is shaped similar to the arm 77 and which extends upwardly and into proximity to the slide 49. This arm has attached to the upper end of it a pin 89 which slides in the slot 87 formed between the two lugs 86. Arm 88 has rotatably attached to it a cam roller 91 which engages a cam 92 attached to shaft 25. This cam is so constructed that the slide 49 is moved outwardly to open the passage through outlet 43 when the roller 91 engages the high part of the cam. A spring 93 is attached at one end to the lever 88 and at its other end to a pin 94 secured to the receiver 27. This spring is sufficiently stiff so that said spring operates the slide 49 in a manner to cut off the passage of dough through the outlet 43 at the required time. By the use of this spring for this purpose a rapid cut off can be had whereby accurate measurement of the dough received within the receiver 27 is procured.

The sleeve 64 of die 53 is reciprocated by means of a lever 95. This lever is pivoted at its center by means of a pintle 96 which is attached to the leg 32 supporting the doughnut cutter A. One arm 97 of the lever 95 is forked and is provided with pins 98 which enter the groove 67 of sleeve 64 and move the said sleeve up and down. The other arm 99 of said lever has pivoted to the end of it a cam roller 101. Roller 101 is adapted to engage a cam 102 fast to shaft 25. This cam is constructed with an adjustable cam face 103 by means of which the opening of the orifice 63 can be accurately controlled, so as to prevent undue pressure within the chamber 28. A coil spring 104 is secured at one end to the arm 99 of lever 95 and at its other end to a bolt 105 attached to a lug 106 issuing upwardly from base 16 of bracket 14. This spring maintains the roller 101 in contact with the cam 102.

The operation of my invention is as follows: Assume that the sleeve 64 is in its lowermost position closing the orifice 63 and that the piston 34 is in the position shown in Fig. 3 and slide 49 is in its closing position. Upon rotation of the shaft 25, roller 91 will commence to climb the cam 92 moving the slide 49 outwardly and opening the outlet 43. Shortly after this action commences, piston 34 commences to travel outwardly. This movement of the piston is extremely slight at the outset and as soon as slide 49 is fully open, piston 34 commences to travel with some rapidity and draws dough from the hopper 38 through the outlet 43 and into the chamber 28 of receiver 27 and into the bore 31 of cylinder 29. This action continues until the piston is in its outward position in which the parts are arranged as shown in Fig. 4. When the roller 91 passes the abrupt part of the cam, slide 49 is quickly closed by the spring 93 and the passage of dough through the outlet 43 is rapidly cut off. This occurs when the piston is at the extreme end of its stroke and when the said piston has practically no movement. At substantially the same time roller 101 drops into the cavity formed in cam 102 and raises sleeve 64, opening the orifice 63. Upon the return movement of the piston 34, dough is forced from the bore 31 and into the chamber 28 where the same passes through the passageway 50 and is extruded from the device through the orifice 63 in an annular tubular formation. When the piston 34 reaches the inner end of its stroke roller 101 engages the adjustable cam face 103 and lever 95 is swung in a manner to cause the sleeve 64 to descend. The beveled end 65 of the sleeve then cooperates with edge 66 of the head 62 to shear off the tubular portion of the dough and form an annular dough ring which drops from the cutter. The die 53 is so situated that the dough formations formed by the cutter are deposited at the proper locality in the channel 13 of pan 10 where the same are progressed through the machine as described in conjunction with the said application for patent of Peter J. Toews. Thereafter the operations are repeated. The dough on being drawn into the bore 31 of cylinder 29 is guided by the surface 72 of said deflector and upon being discharged from the bore 31 of cylinder 29 is guided by the surface 73 of said deflector into the passageway 50 of die 53.

My invention is highly advantageous in that an extremely simple and practical construction is provided whereby annular portions of dough formations may be formed and deposited into the cooking liquid. The arrangement of the parts are such as to make the device extremely convenient to operate. All of the operating parts of the cutter being below the hopper, the hopper can be readily removed for cleaning and inspection. For the same reason the dough is easily placed into the hopper and no obstructions are present in the hopper, so that the dough readily enters the cutter. By means of the slide used for severing the dough from the hopper accurate cut off can be procured so that the quantities of dough utilized are equal and accurately measured. By the arrangement of the cylinder and receiver, a minimum amount of churning of the dough results, whereby finer doughnuts are procured. At the same time less energy is required to operate my machine. With my invention the dough travels continuously through the machine so that there are no pockets, corners, or other places in the machine from which the dough is not removed and in which stagnant dough can lodge. All of the operating parts of the invention are closely associated so that little strain is placed upon the same and in addition positive and accurate operation of the device can be procured.

While I have shown my invention as utilized with the machine of Peter J. Toews, it can readily be comprehended that the operating mechanism shown has been selected simply for the purpose of illustration and that any type of operating mechanism can be employed such as can easily be designed by an ordinary mechanic, the feature of the invention residing in the construction of the cutter itself and in the arrangement and disposition of the parts thereof.

Changes in the specific form of my invention, as herein disclosed, may be made within the scope of what is claimed without departing from the spirit of my invention.

Having described my invention, what I claim as new and desire to protect by Letters Patent is:

1. A dough cutter comprising a dough hopper having a downwardly directed outlet, a vertically extending tubular receiver disposed below said hopper and communicating at its upper end with said hopper through said outlet, a die at the lower end of said receiver, means for controlling the passage of dough through said outlet and die, a horizontally extending cylinder communicating with said receiver intermediate its ends, a piston in said cylinder and a V-shaped deflector in said receiver opposite said cylinder and arranged with its vertex directed toward said cylinder.

2. A dough cutter comprising a dough hopper constructed with a bottom having an outlet and downwardly facing face, a receiver disposed below said hopper and having a top constructed with an upwardly facing face underlying the face of said hopper and with an inlet communicating with said outlet, one of said faces having a groove therein, a slide of a thickness equal to the depth of said groove, and slidable in said groove and adapted to close communication between said outlet and inlet, means for clamping said hopper to said receiver with the faces thereof in juxtaposition, a die communicating with said receiver, means for controlling the passage of dough through said die, a cylinder communicating with said receiver at a locality between said slide and die, and a piston in said cylinder.

3. A dough cutter comprising a dough hopper constructed with a bottom having an outlet and a downwardly facing face, a receiver disposed below said hopper and having a top constructed with an upwardly facing face underlying the face of said hopper and with an inlet communicating with said outlet, the top of said receiver having a groove in the face thereof, a slide of a thickness equal to the depth of said groove, slidable in said groove and adapted to close communication between said outlet and inlet, means for clamping said hopper to said receiver with the faces thereof in juxtaposition, a die communicating with said receiver, means for controlling the passage of dough through said die, a cylinder communicating with said receiver at a locality between said slide and die, and a piston in said cylinder.

4. A dough cutter comprising a dough hopper having a downwardly directed outlet, a vertically extending tubular receiver disposed below said hopper and communicating at its upper end with said hopper and at its lower end with said outlet, a die at the lower end of said receiver, means for controlling the passage of dough through said outlet and die, a cylinder and a piston for procuring flow of dough through said receiver, and a laterally extending fixed support for dough disposed within said receiver said support deflecting the travel of dough at the locality thereof laterally during discharge of the dough from the cylinder.

5. A dough cutter comprising a dough hopper having a downwardly directed outlet, a vertically extending tubular receiver disposed below said hopper and communicating at its upper end with said hopper and at its lower end with said outlet, a die at the lower end of said receiver, means for controlling the passage of dough through said outlet and die, a horizontally extending cylinder communicating with said receiver intermediate its ends, a piston in said cylinder and a fixed deflector in said receiver situated opposite said cylinder, said deflector having surface for directing dough from said hopper and into said cylinder and another surface for directing dough from said cylinder and into said receiver.

ALEXANDER S. T. LAGAARD.